Aug. 7, 1934.    W. KOTVIS ET AL    1,969,223
LOCK NUT
Filed Feb. 16, 1933

Inventors
W. Kotvis.
F. A. Chapman.
L. W. Dortland.

Patented Aug. 7, 1934

1,969,223

UNITED STATES PATENT OFFICE 1,969,223

LOCK NUT

William Kotvis, Fred A. Chapman, and Lloyd W. Dortland, Hillsboro, Wis.

Application February 16, 1933, Serial No. 657,116

5 Claims. (Cl. 151—19)

This invention relates to an improved lock nut and seeks, among other objects, to provide a device of this character wherein the nut will be securely fixed upon a bolt so that vibration cannot serve to release the nut while, however, the nut may, without mutilation of the parts, be manually removed when so desired.

A further object of the invention is to provide a device embodying an outer shell and an inner bushing slidable in the shell and movable thereby to clamp the bolt, and wherein, after the shell is tightened against the work, the inner end of the bushing will be clinched to the shell for locking the parts against relative movement so that should the work shrink or for any other reason should the work recede from the shell and thereby relieve the endwise pressure on the shell, the shell cannot shift relative to the bushing to effect loosening of the nut on the bolt.

And the invention seeks, as a still further object, to provide a bushing of peculiar construction whereby the inner end of the bushing may be readily upset into clinched engagement with the shell.

Other and incidental objects of the invention, not particularly mentioned in the foregoing, will be apparent during the course of the following description.

Figure 1:
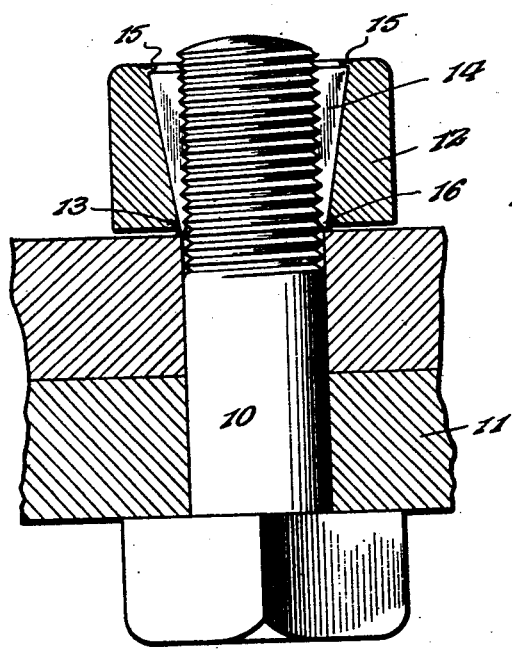
Figure 2:
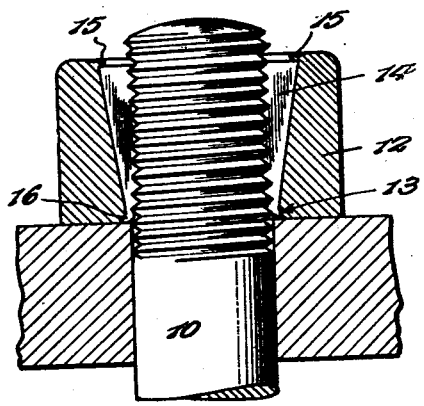
Figure 4:
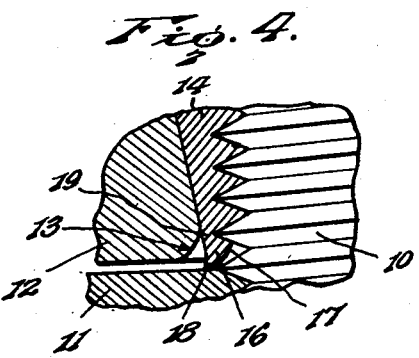
Figure 3:
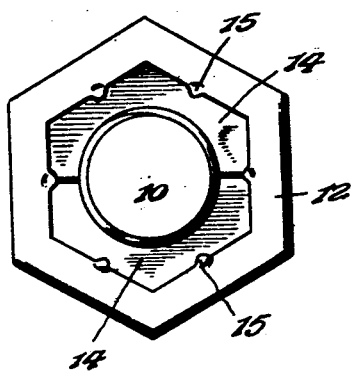
Figure 5:
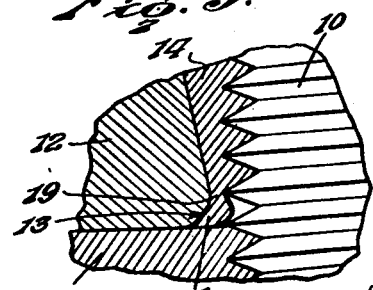

In the accompanying drawing,

Figure 1 is a sectional view showing our improved nut in connection with a conventional bolt and illustrating the position of the parts just before the nut has been tightened into engagement with the work, Figure 2 is a fragmentary sectional view showing the position of the parts after the nut has been tightened into engagement with the work, Figure 3 is a plan view of the nut, Figure 4 is a fragmentary section on an enlarged scale, showing the initial position of the clinching lip of the bushing before the lip is flared into engagement with the shell, and Figure 5 is a view similar to Figure 4 showing the clinching lip flared or bent to engage the shell.

Referring now more particularly to the drawing, we have shown a conventional bolt at 10 and the work at 11. In accordance with the present invention, we provide a polygonal shell 12 provided with a smooth opening therethrough which is tapered towards its lower end, and formed on the shell, at the junction of said opening with the lower face of the shell, is, as particularly seen in Figure 4, a rounded shoulder 13 flaring away from said opening. Slidably fitted in the tapered opening of the shell is a tapered bushing 14 preferably formed of semi-cylindrical sections, and struck from the shell, at its upper edge, are overhanging lips 15 limiting the sections of the bushing against displacement at the upper or outer side of the shell. The bushing is provided with a center bore conforming to the diameter of the bolt 10 and the sections of the bushing are, as shown, threaded to engage the bolt. However, as brought out in Figure 3, some space is provided between the vertical faces of the bushing sections at opposite sides of the bolt so that said sections may be shifted radially into engagement with the bolt. Formed on the bushing, at its lower or inner end, is an annular clinching lip 16 having an annular convex inner face 17 and, as will be observed, the lip is provided with an outwardly flared lower tip 18. The outer circumference of this tip is less than the smallest portion of the tapered opening through the shell 12 so that the bushing may be readily arranged within the shell and attention is now directed to the fact, as particularly seen in Figures 4 and 5 of the drawing, that the thread groove of the bushing adjacent the lip 16 extends close to the outer periphery of the lip at its base end to provide a weakened neck 19 connecting the lip with the bushing.

In use, the bushing is engaged with the bolt 10 when the shell 12 is manually rotated for advancing the nut upon the bolt. As the shell is thus rotated, the bushing will be fed forwardly or downwardly within the shell with the result that the flared tip 18 of the lip 16 of the bushing will, as shown in Figures 1 and 4, first contact the work 11. At the same time, the sections of the bushing will, as will be seen, be crowded towards each other to firmly clamp the bolt. Further rotation of the shell 12 from the position shown in Figures 1 and 4 of the drawing will, after the tip 18 of the bushing has engaged the work, feed the bushing downwardly when the tip 18 of the lip 16 will coact with the work, as particularly seen in Figure 4, for directing the lip outwardly and starting the lip to bend at the neck 19. Continued rotation of the shell 12 with the further downward feeding of the bushing will thus cause the face 17 of the lip to be brought into contact with the work when said face will coact with the work for further bending the lip at the neck 19 and flaring the lip outwardly into engagement with the shoulder 13 of the shell, as shown in Figure 5, and thus clinching the bushing to the shell. Thus, when the nut is finally tightened against the work, as shown in Figures 2 and 5 of the drawing, the lip 16 will coact with the shoulder 13 for locking the shell and bushing against relative movement, while, at the same time, the shell will bind the sections of the bushing in tight engagement with the bolt so that vibration cannot serve to loosen the nut. Furthermore, should the work shrink or if, for any other reason, the work should be caused to recede from the nut, the shell cannot shift axially relative to the bushing to release the constriction of the bushing sections by the shell and accordingly relieve the clinching action of the bushing sections on the bolt. Accordingly, the nut will remain firmly fixed upon the bolt at all times. However, by exerting sufficient turning force on the shell 12 to overcome the binding action of the bushing sections on the bolt, the nut may, when so desired, be counter-rotated and removed from the bolt without mutilation of the parts.

Having thus described the invention, we claim:

1. A lock nut including a shell having a tapered opening therethrough, and a contractable bushing slidable in said opening and provided with clinching means bendable into engagement with the shell by work at the inner face of the shell for securing the shell and bushing against relative axial movement.

2. A lock nut including a shell having a tapered opening therethrough, and a contractable bushing slidable in said opening and provided at its work engaging end with a clinching lip bendable into engagement with the shell by work at the inner face of the shell for securing the shell and bushing against relative axial movement.

3. A lock nut including a shell having a tapered opening therethrough and provided with a rounded shoulder at the work engaging end of said opening, and a contractable bushing slidable in the shell and provided at its work engaging end with an annular clinching lip bendable into engagement with said shoulder by work at the inner face of the shell for securing the shell and bushing against relative axial movement.

4. A lock nut including a shell having a tapered opening therethrough, and a contractable bushing slidable in said opening and provided at its work engaging end with a clinching lip joined to the bushing by a weakened neck adapted to bend when the lip meets work to be secured whereby the lip will be shifted into engagement with the shell for securing the shell and bushing against relative axial movement.

5. A lock nut including a shell having a tapered opening therethrough and provided at the work engaging end of said opening with a rounded shoulder, and a sectional bushing slidable in said opening and provided at its work engaging end with an annular lip flared outwardly at its tip and provided with a convex forward face engageable with an obstruction for bending the lip into engagement with said shoulder for locking the bushing and shell against relative axial movement.

WILLIAM KOTVIS. [L. S.]
FRED A. CHAPMAN. [L. S.]
LLOYD W. DORTLAND. [L. S.]